United States Patent

[11] 3,629,773

| [72] | Inventor | Bernard A. Shoor<br>Atherton, Calif. |
|---|---|---|
| [21] | Appl. No. | 787,529 |
| [22] | Filed | Dec. 27, 1968 |
| [45] | Patented | Dec. 21, 1971 |
| [73] | Assignee | Becton, Dickinson Electronics Company<br>Pasadena, Calif.<br>Original application Apr. 10, 1967, Ser. No. 629,496, now Patent No. 3,474,526, dated Oct. 28, 1969. Divided and this application Dec. 27, 1968, Ser. No. 787,529 |

[54] TRANSDUCER
11 Claims, 13 Drawing Figs.

[52] U.S. Cl. .................................................. 338/43, 73/71.2, 338/6
[51] Int. Cl. ....................................................... G01b 7/16, G01p 15/08
[50] Field of Search .......................................... 338/2, 5, 6, 43, 46; 29/434, 592, 593, 595; 73/517, 517 R, 71, 71.2

[56] References Cited
UNITED STATES PATENTS

| 2,453,548 | 11/1948 | Statham | 338/2 |
|---|---|---|---|
| 2,481,792 | 9/1949 | Statham | 338/2 X |
| 2,835,774 | 5/1958 | Statham | 338/2 |
| 2,907,560 | 10/1959 | Stedman | 338/43 |
| 2,909,744 | 10/1959 | Giovanni | 338/6 |

*Primary Examiner*—Rodney D. Bennett, Jr.
*Assistant Examiner*—T. H. Tubbesing
*Attorney*—Reed C. Lawlor ABSTRACT: Stops are provided to limit the displacement of a moving member of a transducer to microscopic distances of less than about 100 microinches and to an accuracy of ± 15 microinches or better in order to protect delicate strain sensitive elements against breakage. The gap is formed by bringing hard elements into contact with soft, work hardenable, elements of the assembled unit and then impacting the hard and soft elements together to form the microscopic gaps by virtue of yielding of the soft element and also because of any consequent hardening to resist further yielding.

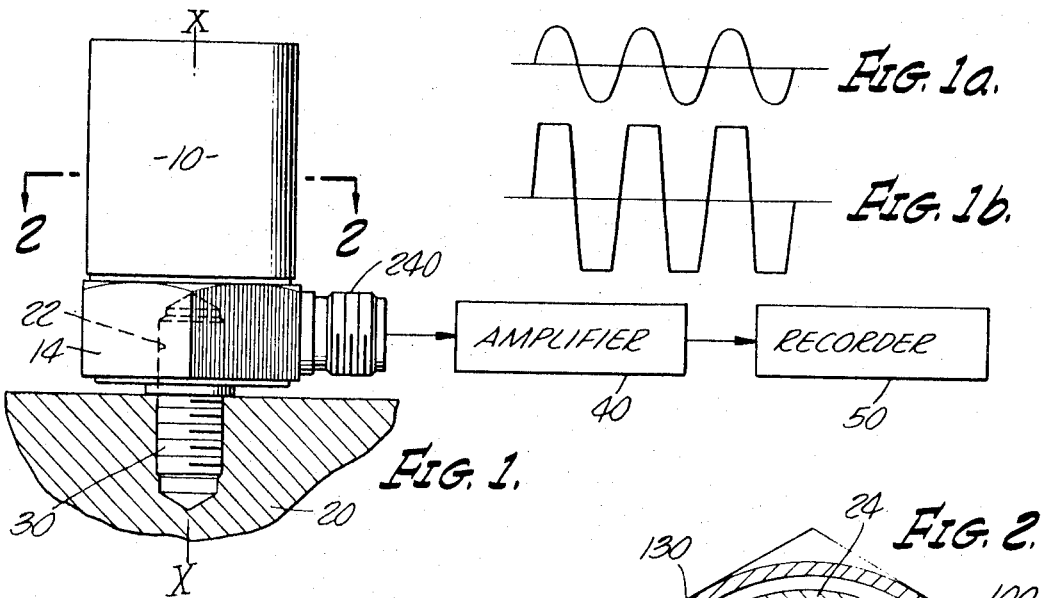
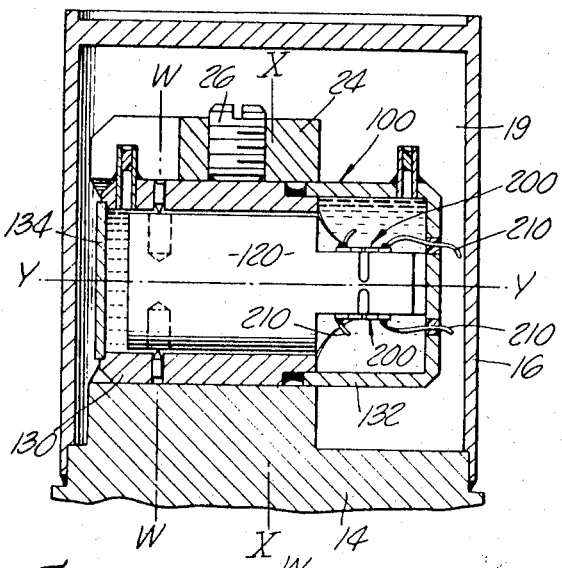
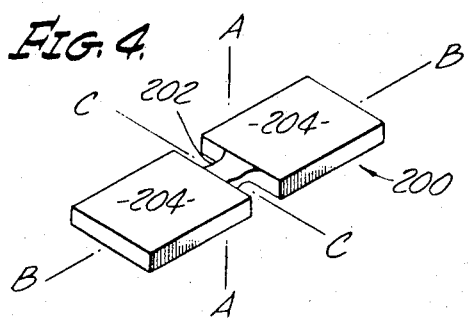
BERNARD A. SHOOR
INVENTOR.

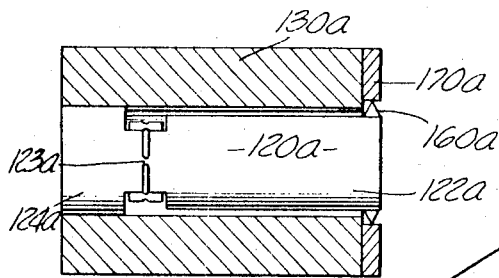
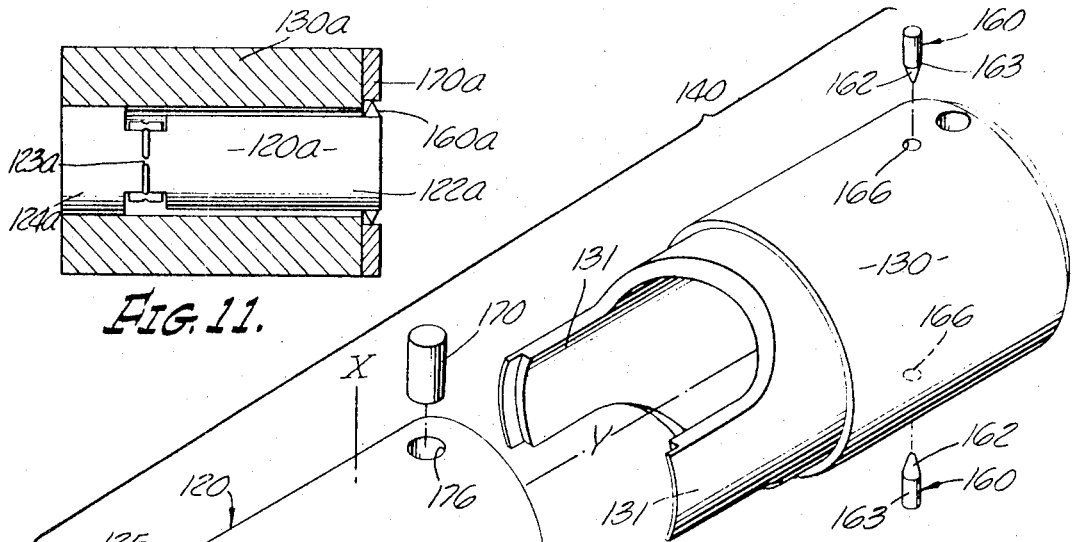
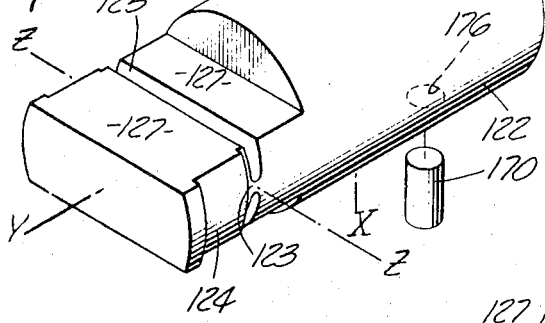
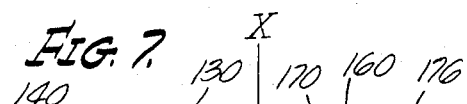
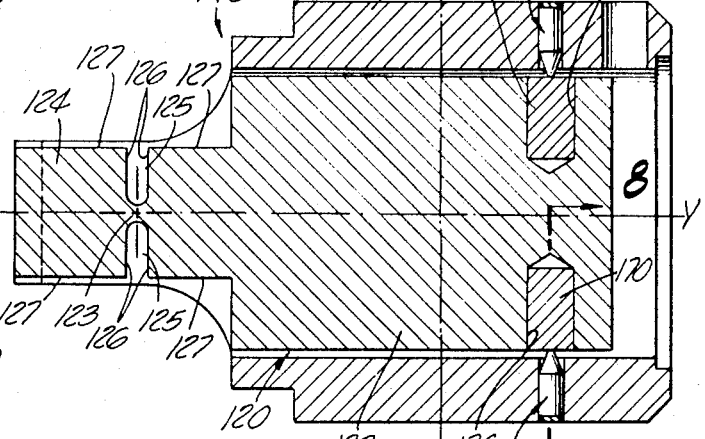
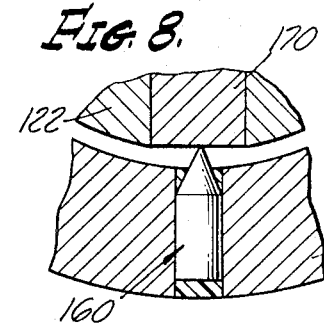
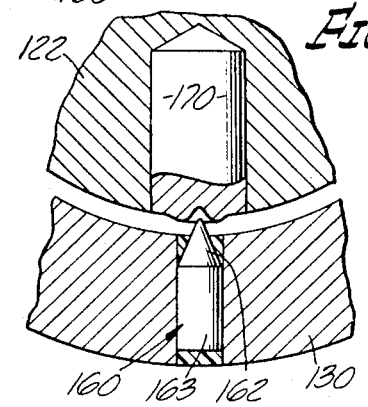
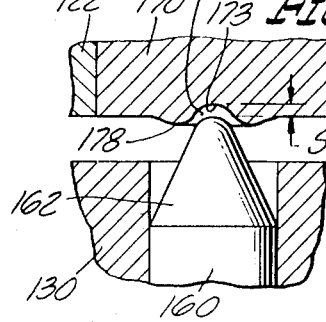
BERNARD A. SHOOR
INVENTOR.
BY *Red C Lawlor*
ATTORNEY

TRANSDUCER

This is a divisional application of my copending patent application Ser. No. 629,496, now U.S. Pat. No. 3,474,526.

CROSS-REFERENCE TO RELATED APPLICATIONS

Pat. application Ser. No. 421,869 Filed: Dec. 29, 1964, now U.S. Pat. No. 3,501,732
Pat. application Ser. No. 609,553 Filed: Jan. 16, 1967
U.S. Pat. No. 3,351,880 Issued: Nov. 7, 1967 now U.S. Pat. No. 3,444,499
U.S. Pat. No. 3,363,471 Issued: Jan. 16, 1968

This invention relates to an improved transducer, such as an accelerometer which, in the absence of this invention, could be easily fractured or otherwise damaged when subjected to excessive forces such as those to which the transducer might be exposed in normal use or even to which it might be exposed accidentally as from dropping the transducer a few inches or so onto a stiff or rigid surface. The invention involves providing stops which may be accurately formed to provide gaps of microscopic dimensions.

The invention relates both to the transducer and to the process by which the stops are made. Though applicable to other transducers, the invention will be described with reference to accelerometers, since the invention is especially applicable thereto.

In this patent application, the following abbreviations will be used frequently:
1. Mil = 0.001 inch
2. Microinch or $\mu$-inch = 0.000001 inch (one millionth of an inch)
3. $g$ = acceleration of gravity at the surface of the earth (32.2 ft./sec.$^2$)

An accelerometer of the type to which this invention has been applied employs an inertial or seismic mass hingedly connected to a base member by means of a flexural connection, hinge, or spring. Delicate piezoresistive elements are supported between the inertial member and the base member across gaps between the two.

In that type of accelerometer, the piezoresistive elements have been of the type described and claimed in U.S. Pat. No. 3,351,880, issued Nov. 7, 1967, and Pat. application Ser. No. 609,553 filed Jan. 16, 1967. Such piezoresistive elements consist of a pair of pads interconnected by a reduced neck having a minimum thickness that may be as little as about 0.5 mil.

In the design of such a transducer various parts of the instrument are so proportioned in dimensions and mass and other electrosensitive elements are operated over a large fraction, such as about one-third, of the ultimate, or safe, strain to which they can be subjected without damage, Unfortunately, damage, such as breakage, can occur. Often the elements break accidentally because the transducer is dropped just a few inches or about a foot onto a table, such as onto a wood- or metal-surfaced table, thereby subjecting the device to an excessive acceleration of many hundreds or thousands of $g$ units at the time of impact. Even placing the accelerometer on a table forcefully by hand can result in breakage. Accelerations of 750 $g$'s or more occur so commonly during handling of an accelerometer, either during manufacture or in use, that it becomes a serious problem when one attempts to employ a delicate strain-sensitive element such as one of the aforementioned piezoresistive elements as part of a transducer for making measurements of accelerations in a full-scale range such as 25 $g$'s, which is only a small fraction of the acceleration to which the accelerometer may be subjected accidentally or during operation. It is often desirable to provide that an accelerometer which is capable of being used over a specified full-scale range of accelerations, such as 25 $g$, have a capability of being used over even a larger range without great loss of accuracy in the measurement of the acceleration. It is therefore desirable to limit the range of operation of an accelerometer in such a way that the strain-sensitive element is always operated within a safe range that exceeds the capability range as well as the full-scale range. The capability range may be about three times the full-scale range and the safe range may be about three times the capability range. The fact that two factors of three are involved is purely coincidental. But in such a case, the full-scale range may be only about 10 percent of the safe range.

In one line of such accelerometers employing strain-sensitive elements of the type mentioned, the elements may be readily employed up to total extension on the element of about 3 $\mu$-inches over a full-scale range, with a high degree of linearity. Such linearity is attained for both positive and negative extensions. Greater accelerations of three times full-scale, would produce extensions over an extended range of about 9 $\mu$-inches. But extensions much larger, above about 27 $\mu$-inches, whether the extensions be positive or negative, could easily result in breakage or other damage to a large percentage of the accelerometers. Accordingly, it is desirable to provide an arrangement for limiting the action of the accelerometer having a full-scale rating of 25 $g$'s to a range of about 75 $g$'s. In one such accelerometer which has been employed, the seismic mass is flexurally mounted at one end for rotation about a hinge axis fixed relative to the base, the free end of the seismic mass moves from its neutral or normal position by a distance of about 20 $\mu$-inches when subjected to a full-scale acceleration of 25 $g$'s. To provide for over range operation up to a factor of about three without damage, it is therefore desirable to limit the movement of the free end of the seismic mass to about 60 $\mu$-inches. To accomplish this result, it is therefore desirable to provide stops that have gaps which are accurately settable to microscopic distances less than about 100 $\mu$-inches. This invention makes it possible to set such gaps to an accuracy of ±15 $\mu$-inches or better. By setting the gaps of an accelerometer to 75 $\mu$-inches ±15 $\mu$-inches, the accelerometer is free to operate over a range of about 3 to 4.5 times full-scale which is well below the safe limit. The invention is also applicable to accelerometers of similar design but operated over other full-scale ranges. For example, it may be employed in accelerometers having a full-scale rating of 1 $g$, which, therefore, might be damaged when exposed to accelerations greater than 10 $g$'s. In this connection, it is to be noted that the range of extension of the piezoresistive element remains the same, though the accelerometer is designed to have a full-scale range of only 1 $g$. For this reason, the gaps must also be set accurately to microscopic distances of the amounts mentioned. Both the structure of the stops employed to attain such accurate setting of microscopic distances and the best process now known for manufacturing such stops is described hereinafter.

In an accelerometer, the seismic mass is generally mounted in a housing which is secured to an object undergoing acceleration. In use, the seismic mass tends to remain stationary in space while the housing moves with the accelerating object. Thus, when considered from an external viewpoint, in an "absolute" sense, the housing moves; and the seismic mass tends to remain stationary. However, when the seismic mass reaches the limit of its movement relative to the housing, it also moves. Even though the seismic mass tends to remain stationary in space, it is movable relative to the case. Hence, it is sometimes convenient to refer to the seismic mass as the movable member.

The invention is also applicable to other kinds of electromechanical transducers.

In any event, both in accelerometers and in other types of transducers where a physical phenomenon, such as force, acceleration, strain, pressure, temperature, or the like is to be detected, two relatively movable members are involved. Strain-sensitive elements, such as piezoresistive or piezoelectric elements are often secured to parts of the relatively movable members of the transducer to detect the relative movement. In order to protect the strain-sensitive elements against damage, it is desirable to limit the relative movement of the two movable members or, in other words, the movement of the "movable member" as viewed from the other, to a range within which the strain-sensitive element will not be strained beyond a safe limit. To this end a pair of stop elements are employed to limit the movement of the movable member to microscopic distances in each direction along its path of movement.

Prior attempts to guard against damage of accelerometers and other transducers from excessive shocks by limiting the movement of the movable member to such microscopic distances have proved to be ineffective. It is just too difficult to set a stop with the desired accuracy by conventional methods. Thus, it is practically impossible to set a threaded screw accurately to such a small distance and to maintain it in that position. For example, to set a screw having a fine thread with a pitch of 200 turns per inch to an accuracy of 15 $\mu$-inches would require setting the screw to within an angle of 1°. This fact, taken with others, illustrates the difficulty of using conventional methods of locating stops accurately to form microscopic gaps of less than about 100 $\mu$-inches with any degree of accuracy.

In accordance with the best mode now known for applying the invention to an accelerometer the movable member, or seismic mass, or inertial mass, is assembled in a housing, or case, and stationary stops firmly secured to the case are brought into intimate contact with movable stop elements forming part of or fixed to the movable member, that is the seismic mass. The stop elements are rigidly secured in place while in such contact. One stationary stop element on one side of the movable member and the movable stop element that is directly opposite it, form a pair of stop elements that limit movement of the two members toward each other on that side. In the best embodiment of the invention now known, one of these stop elements is made of a hard material, such as diamond, synthetic sapphire, or tungsten carbide, and the other is made of a work-hardenable material such as beryllium copper or certain well-known stainless steel alloys. The terms "hard" and "soft" are employed in this application to describe the relative hardness of the needle and the pad which together form the stop structure relative to each other.

The hard stop may be in the form of a phonograph needle, while the soft stop may be in the form of a rod with a substantially flat end. After the stationary stop elements are brought into contact with the stop elements and rigidly secured in place, the entire unit is then repeatedly subjected to impact forces in one direction and then the other, along the line of motion of the seismic mass. The impact forces cause the hard stop element to force the material of soft, work hardenable, element to exceed its yield point and thus become permanently deformed. At the same time it becomes work hardened. In a sense, the hard stop acts as a hammer and the soft stop as an anvil. As a result of this process, wells, or dimples, or indentations are formed in the work hardenable stop elements directly opposite the hard-material stop elements. The wells have a concave bowllike shape and have upset or protruding annular ridges around their centers. Thus the profiles of the wells are craterlike, being concave in the center and convex at their edges. By carefully controlling the impacting process, wells of predetermined depth, and hence gaps of predetermined thickness, are formed. In this way, gaps are provided for limiting the range of movement of the movable element to a safe value. By providing such stops on both sides, the transducer is protected against breakage over a wide range of intense shocks to which it may become subjected above the full-scale range over which it is designed to operate.

The invention not only makes it possible to protect the force-sensitive or strain-sensitive element of the transducer, but also serves to prevent the overload of electrical equipment which is connected to the transducer to detect its output. This avoidance of overloading of the electrical equipment arises because the electrical output of the electrosensitive elements employed in the transducer is limited in accordance with the limitations of the excursion of the movable element by the stops. For this reason, electrical signals generated by these electron-sensitive elements are restricted to a limited range for which the electrical equipment may be designed to respond uniformly without being overloaded.

While the invention will be described particularly with reference to accelerometers that employ piezoresistive elements, it will be understood by those skilled in the art that the invention may also be employed in accelerometers that employ other types of electrosensitive elements and in other types of transducer.

The foregoing, and other features and advantages of the invention will become apparent from the following description taken in connection with the accompanying drawings in which:

FIG. 1 is a block diagram of the invention applied to an accelerometer;

FIGS. 1a and 1b are graphs showing how the output of the accelerometer varies with amplitude;

FIG. 2 is a cross-sectional view of the accelerometer taken on the plane 2—2 of FIG. 1;

FIG. 3 is a cross-sectional view taken on the plane 3—3 of FIG. 2;

FIG. 4 is a perspective view of a piezoresistive element employed in the accelerometer specifically described herein;

FIG. 5 is a schematic drawing illustrating one step in the manufacture of the stops;

FIG. 6 is an exploded perspective view of a subassembly of the accelerometer;

FIG. 7 is a vertical cross-sectional view of the subassembly;

FIGS. 8, 9, and 10 are enlarged detailed drawings employed to explain the process of making the stops; and FIG. 11 is a vertical cross-sectional view showing an alternative form of the stops.

In the specific embodiment of the invention, an accelerometer 10 is attached to an object 20 undergoing test by means of a stud 30, as illustrated in FIG. 1. The accelerometer develops electrical signals in response to the acceleration of the object 20. These electrical signals are applied to an electrical amplifier 40, the output of which is applied to a recorder 50 or other acceleration indicating or utilization device as indicated in FIG. 1. In many applications, the amplifier is omitted and the amplifier 40 replaced by suitable electrical circuitry for applying the output of the accelerometer to the utilization device 50 without amplification. The accelerometer 10 includes an acceleration detecting unit 100 in the form of an accelerometer cartridge which is rigidly mounted in place on a base 14 which, together with a cap member 16, constitute a sealed housing 19.

The accelerometer unit 10 which detects the acceleration includes a mass structure 120 of cantilever configuration as illustrated in FIGS. 2, 3, and 6, together with other elements mounted on a support tube 130, to form a subassembly or subunit 140 which forms the main part of the accelerometer cartridge 100. This subassembly may be filled with damping fluid such as oil.

The accelerometer is characterized by three principal mutually perpendicular axes. The X—X-axis is the axis of acceleration which, for purposes of this description, will be considered a vertical axis. The other axes, that is the Y—Y- and Z—Z-axis lie transverse to the acceleration axis and are considered to lie in a horizontal plane in this description. The Y—Y-axis is the longitudinal axis of the mass structure 120 and the axis Z—Z is the hinge or rotational axis about which part of the mass structure rotates in response to acceleration of the accelerometer along the axis X—X as explained more fully hereinafter.

The base 14 is provided with a threaded mounting hole 22 to receive the stud 30, as indicated in FIG. 1. The base 14 is also provided with an electrical connector 240 through which electrical conductors 210 lead to strain-sensitive elements 200 that are mounted in the accelerometer unit. The accelerometer unit is generally of cylindrical configuration and is rigidly mounted in place within the housing 19 by means of a mounting ring 24 and screws 26. The case of the accelerometer unit is in the form of a sealed envelope consisting of three parts: the substantially tubular mounting member 130, an inverted cup-shaped cover 132 secured to one end thereof; and a closure plate 134 at the other end thereof.

The mass structure comprises a unitary member in the form of an enlarged block or inertial member 122 of cylindrical configuration flexurally connected to a base or anchor member 124 by means of a hinge in the form of a reduced portion 123.

The mass structure 120 is formed from a solid block of heavy metal, such as sintered tungsten or other dimensionally stable solid substance of high density. The support tube 130 is constructed of the same heavy metal. By employing a heavy metal for the inertial member, high sensitivity per unit volume is obtained. By employing the same metal for the support tube differential thermal expansion of the mass structure and the support tube are avoided. Suitable metals include Densalloy No. 5, manufactured by Powder Alloys Corporation, Clifton, N.J., or similar alloys manufactured by Mallory Metallurgical Company of Indianapolis, Ind. The specific gravity of such material is abnormally high, being about 17. Another suitable material so far as density is concerned, would be depleted uranium which also has abnormally high density.

As indicated in FIG. 6 the mounting tube 130 is provided with a pair of arms 131 that extend horizontally along the longitudinal or Y—Y-axis of the mass structure. The base 124 of the mass structure is reduced in thickness in a vertical plane compared with the inertial member and is firmly mounted in place on the mounting tube by being welded or otherwise secured to the ends of the mounting arms 131.

As indicated in FIGS. 6 and 7 a flexural hinge 123 is formed in the mass structure 120 by means of a pair of vertical slots 125 that extend horizontally through the neck of the mass structure along the axis X—X of rotation and perpendicular to the longitudinal axis Y—Y. The slots extend along a vertical plane perpendicular to the longitudinal axis Y—Y. The hinge axis Z—Z lies at the center of the reduced portion provided by the slots 125. The neck between the slots is narrow in a vertical plane perpendicular to the axis Y—Y but long along the axis Z—Z. For this reason the seismic mass is constrained against movement in any direction other than along a path W—W about the horizontal Z—Z of rotation.

One slot 125 extends upward and the other slot 125 extends downward from the hinge axis Z—Z of the block. Each slot 125 has two opposing faces 126. The horizontal faces 127 of the block at the extremities of each slot are substantially coextensive, when the cantilever mass structure is free from any bending forces, having been part of the same common plane surface prior to forming of the slots.

In effect, the mass structure comprises two members 122 and 124, namely an inertial member and a base member respectively. The base member 124 is anchored to the case of the cartridge. The inertial member 122 is connected to the base member along a flexural hinge 123 which is established by the reduced portion between two slots 125. When installed in the housing the base member remains stationary relative to the case and the inertial member is movable relative to the base when the accelerometer is subjected to acceleration along the axis X—X.

Strain-sensitive sensors in the form of piezoresistive elements 200 are mounted across the gap on each side of the flexural member as indicated in FIGS. 2 and 3. The piezoresistive elements are employed to detect changes in the widths of the respective gaps when the inertial member is forced, by virtue of the acceleration of the accelerometer along the axis X—X, to rotate about the hinge axis Z—Z.

Suitable electrical leads 210 connected to the piezoresistive elements 200 lead through the connector 240 to connect the piezoresistive elements in a bridge circuit at the input of the amplifier 40 in conventional manner.

As shown in FIG. 4 each of the piezoresistive elements comprises a unitary member composed of a piezoresistive semiconductor material and has a short narrow neck 202 separating two enlarged coplanar pads 204 as illustrated in FIG. 4. Each of the piezoresistive elements is mounted across the corresponding slot with the pads cemented with nonconductive cement to the substantially coplanar faces at the ends of the slot. One enlarged pad of each piezoresistive element is cemented to the base 124 and one is cemented to the movable mass 122. The neck 202 of each of the electrosensitive elements bridges the gap at the end of one of the slots. Such electrosensitive elements and their mounting arrangements are described and claimed in more detail in copending patent application Ser. No. 421,869, filed Dec. 29, 1964, and in U.S. Pat. No. 3,351,885 issued Nov. 7, 1967.

The neck 202 of each of the piezoresistive elements is of smooth hourglass configuration. The reduced neck has a length of about 8 mils along a horizontal axis B—B parallel to the axis Y—Y, a width of about 7 mils at the thinnest point in the horizontal direction C—C parallel to the axis of rotation Z—Z, and a thickness at the thinnest point of about 0.5 mil in a vertical direction A—A parallel to the acceleration axis X—X. The cross section is not rectangular but more or less of oval configuration. The hourglass configuration tends to minimize the force necessary to stretch or compress the electrosensitive elements since most of the deformation occurs at the narrowest portion, and the small cross section allows a relatively small force to deform the piezoresistive elements. Such a piezoresistive element bears thin glass coatings, giving strength to the neck and acting as insulation for the pads.

In the particular embodiment of the invention full-scale deflection is attained when the end of the inertial member is displaced by a small amount of about 20 $\mu$-inches. The piezoresistive elements and the accelerometer are intended to be employed in ranges corresponding to smaller displacements. Thus, for example, the accelerometer in question is designed to produce full-scale output that is very nearly proportioned to acceleration up to a limit of say, 25 g's. For convenience, this is referred to as the full-scale range.

When the accelerometer is vibrated or shocked in a direction along the axis X—X, the housing is accelerated in a direction along that axis. This acceleration is communicated to the casing 130 of the accelerometer unit 100 by virtue of the rigid mounting provided by the mounting ring 24 and screw 26. Because of its inertia, the mass member 122 tends to remain stationary during such acceleration, at least at frequencies below the resonant frequency. As a result, the mass member 122 rotates relative to the cartridge casing 130 about the axis Z—Z of rotation. This rotation causes the slots 125 to vary in width in a corresponding manner, thus applying compressive and tension forces to the piezoresistive elements 200, thereby straining their necks 202, and causing the electrical resistances between their ends to vary in a manner corresponding to the magnitude of the acceleration. At the same time, the stop gaps P vary in thickness, each increasing in thickness while the other decreases in thickness.

Such piezoresistive elements are easily strained beyond a safe limit, thereby altering their strain vs. resistance characteristics or even breaking them. In practice, the mass structure is so designed that displacement of the inertial member at the extreme end of the range of accelerations to be detected, occurs when the piezoresistive element has been strained to a maximum amount well below the fracture point or to a lesser extent consistent with some design specification such as maintenance of linearity throughout the range of operation. Piezoresistive elements of the kind involved here have a nearly constant gage factor up to about one-tenth of the strain at which they would exceed a safe limit. In that range the change in resistance is nearly proportional to strain. Above that range departures from linearity occur, the degree of departure increasing with the strain.

In practice, the piezoresistive elements described are safe to use up to a total extension of about 27 $\mu$-inches. Sometimes, failure occurs earlier for negative extensions than for positive extensions. The extension of 27 $\mu$-inches corresponds to the extreme value to which each of the strain gauge elements may be safely subjected before breaking. Employing a safety factor of about three requires that the maximum extension of the piezoresistive elements be less than about 9 $\mu$-inches. Taking into account the fact that the mass structure has a length along its longitudinal axis Y—Y about 6 times the distance of the strain gauge elements from the axis of rotation Z—Z means that in this case the displacement of the ends of the mass member 122 relative to the cartridge casing 130 should be less than about 54 μ-inches.

In the particular embodiment of the invention illustrated, the mass structure had a length of about 0.43 inch, and a maximum diameter of 0.190 inch; the base had a height of 90 mils; the flexural neck had a thickness of about 15 mils in a vertical direction; and the hinge axis Z—Z was located about 87 mils from the stationary end of the base. The depth of the slots 124 was 38 mils and the axis W—W of the stops was 0.270 inch from the axis Z—Z of rotation, thus establishing the mechanical advantage of 6 thereby, causing changes in thickness of the gaps P to be 6 times changes in extension of the piezoresistive elements, as mentioned above. This particular accelerometer had a resonant frequency of 2,500 cps. and by virtue of the use of oil damping could be operated at frequencies from about that value down to zero-frequency, or steady-state, accelerations.

In this invention, special stops are employed to limit the extension of the strain-sensitive element to a safe range below which it will not be damaged. In the specific accelerometer described the stops limit the movement of the inertial member of the accelerometer relative to the case, to a safe range below which damage of the strain-sensitive elements will not occur when the accelerometer is subjected to high accelerations of about 750 g's. To this end, special limit stops are located on opposite sides of the inertial member along the path W—W of its motion relative to the housing about the rotation axis Z—Z. Each of the stops is established by means of a pair of separate stop members that are cemented in the inertial member 122 and the mounting tube 130 respectively.

In the embodiment of the invention disclosed, a stop member 160 in the form of a polished needle, is rigidly mounted in the mounting tube 130 with the needle projecting along the path W—W toward the mass member; and an anvil or pad 170 in the form of a cylindrical member is securely mounted in the mass member 122 opposite the needle. The needle 160 is very small having a total length of 45 mils, a shank 163 having a length of about 30 mils, and a tapered or conical end 162 having a length of about 15 mils. The diameter of the shank is about 16 mils and the tip or "point" of the conical end has a spherical surface having a radius of about 3 mils. The spherical surface of the point is tangential with the conical surface of the end 162. The pad has a diameter of about 40 mils and a length of about 90 mils.

Each of the pads 170 is formed with a shallow well 173 in its surface opposite the needle and the surface is work-hardened to mate with the point of the needle accurately. In the particular embodiment of the invention, the spacing s between the surfaces of each of the opposed stop members 160 and 170 is established at about 75 μ-inches ±15 μ-inches.

In order to attain accurate setting of the gaps P between the stop member of each pair, radially extending bores 176 are first drilled into diametrically opposite sides of the inertial member. The pads 170 are secured therein by applying epoxy cement to the interior of the bores and pushing the pads into the respective bores, and permitting the cement to harden. The outer ends of the pads are flat and they are flush with the outer surfaces of the inertial member 122.

Additional holes 166 are drilled into the mounting tube in diametrically opposite positions in alignment with the bores 176 in the inertial member 122. Epoxy cement is applied to the side surfaces of the needles, and the needles are then placed in the holes and pushed snugly against the opposite anvil members, and the glue is permitted to harden.

In practice, the mass structure 120 is inserted into the mounting tube. Epoxy cement is applied to the sides of the base 124 of the mass structure and the mass structure is inserted in the mounting tube 130, bringing the arms 131 of the mounting tube into intimate contact with the sides of the cement bearing base 124. This cement is then hardened. In one specific embodiment of the invention, the diameter of the inertial member was 0.190 inch, the inner diameter of the mounting tube was 0.200 inch and the outer diameter of the mounting tube was 0.300 inch. With this arrangement, an annular space having a thickness of about 5 mils was established between the mass element 122 and the mounting tube 130.

While the deposits of epoxy cement on the needles and pads are still in their fluid state, the needles 160 are pushed into intimate contact with the pads 170 by the application of light pressure. In effect, the needles just barely touch the pads. A very weak U-shaped spring 190 having a pair of inwardly directed fingers are brought into contact with the outer ends of the needles 160 to hold them in place. The spring applies just enough pressure to maintain the needles in a balanced condition in contact with the pads. (In this particular process, a C-clamp 180 as shown in FIG. 5, need not be used.)

The entire assembly is then placed in an oven where the epoxy cement is cured and hardened, thereby cementing the mass structure firmly in place within the mounting tube and cementing the pads 170 and needles 160 in place. In this operation, the acceleration axis X—X and the axis W—W are maintained in a horizontal position so that the mass structure is located in a central position within the mounting tube. Thereafter, the U-shaped spring 190 is removed. But the needles 160 still bear equally with small predetermined pressures against the outer surfaces of the pads 170.

The mass structure 120, the mounting tube 130, and the stop members 160 and 170 thus arranged and cemented together, form a subassembly which is then processed in the manner described below in order to produce the desired gaps between the needles 160 and the respective pads 170.

To produce microscopic gaps for permitting movement of the inertial member relative to the case of the cartridge up to the predetermined desired limit, the subassembly is mounted on an elevator of a shock table with the axis Z—Z of rotation horizontal and it is repeatedly dropped a small distance, such as a few inches or a foot, onto a platform composed of hard rubber or wood or other stiff material. The dropping action is controlled to subject the subassembly to high accelerations which, in the absence of limit stops, could strain the piezoresistive elements beyond the breaking point. For the specific accelerometer illustrated, an acceleration of about 750 g's or more are generally applied, applying a somewhat sustained working force to the stop elements. Such shocks force a needle into the corresponding pad, indenting its surface, stressing the material in the pad beyond its yield point, deforming it permanently, and forming a shallow concave bowl-shaped well in the surface of the pad. At the same time, the material of the pad is work hardened because of the impacting action. The only heat applied is that generated by the application of the working force.

As such shocks are repeatedly applied, the well, or pocket, is deepened and widened. For this reason and because of the work hardening, each successive shock produces a smaller increase in the gap, the total approaching an ultimate or asymptotic value of about 75 μ-inches. As the shocks are applied to a pad the material of the pad is forced outwardly from the center producing raised or upset ridges 178. The wells, therefore, have cross sections of craterlike configuration and their central concave surfaces mate with the points of the needles closely. As a result, a bowl-shaped well, or pocket, is formed in the surface of each pad 170 as illustrated with some exaggeration in FIGS. 9 and 10. The cartridge is then turned over and the process repeated. As a result, a gap having a predetermined microscopic thickness is formed between the stop members of each stop structure.

It will be noted that the tips of the needles are flush with the original surface of the pad, as indicated in FIGS. 9 and 10. The spacing between the tips of the needles is equal to the thickness of the outer surface of the seismic mass prior to the forming process but is less than the spacing between the ridges 178 that protrude from opposite sides of the mass structure.

By impacting the unit in this manner, small gaps of about 75 μ-inches ± about 15 μ-inches or less are formed. The mouth of the well is about 0.002 inch wide from crest to crest of ridges on the opposite side thereof. It is to be noted that in this particular case, the gaps provide for an over range capability between about 75 g's to about 112 g's.

When the pas are formed by the process described above, the piezoresisitive elements may be cemented in place across the ends of the slots 125 either before or after forming the gaps.

When the piezoresistive elements are mounted in place prior to forming the gaps, measurements may be made of maximum changes of resistance of the piezoresistive elements during the impacting process, thus assuring that the piezoresistive elements are not extended beyond their anticipated range of use.

To make such measurements during impacting, the piezoresistive elements are connected in a bridge or other suitable electrical circuit and the output of the circuit is applied to an oscilloscope. From a knowledge of the characteristics of the piezoresistive elements, the current applied to the bridge circuit, and the calibration of the oscilloscope, the ratio of the deflection of the beam of the oscilloscope to the extension of the piezoresistive element is known. Methods of calibrating testing equipment in this manner are readily understood by those skilled in the art and may be readily provided by them without further explanation. In practice, therefore, knowing in advance the oscilloscope beam deflection that would correspond to the extension, e.g., 9 μ-inches, corresponding to the capability range, the impacting is repeated until such deflection is produced. With the particular accelerometer described in detail herein, about two or three strong impacts with 750 g acceleration are sufficient to produce gaps of the desired size.

After the gaps have been formed the subassembly 140 is mounted in its cartridge and then assembled in the housing. At some appropriate point in the assembly operation, the accelerometer unit is accurately calibrated on a shaking table or centrifuge and the output checked to determine whether, in fact, the desired capability range of the accelerometer has been attained.

In an other method of producing gaps, after the cement has been applied to the pads and the needles and while the cement is still in a fluid condition, the mounting tube 130 is distorted by being compressed laterally by means of a C-clamp 180 as illustrated in FIG. 5. With parts having the dimensions referred to above, the C-clamp 180 was compressed to reduce the thickness of the annular space by almost 5 mils directly opposite the C-clamp and to increase the thickness to almost 10 mils along the axis W—W through the center of the needles 160 and the pads 170. Again, the needles 160 are pushed into intimate contact with the pads 170 and a very weak U-shaped spring 190 is employed to hold the needles in contact with the pads 170. In this case while the assembly is so clamped, it is placed in an oven and the cement cured while the axis X—X and W—W are maintained in their horizontal position. After the cement is cured the C-clamp and U-shaped spring 190 are removed.

Microscopic gaps are then formed by repeatedly impacting the subassembly under controlled conditions and a predetermined number of times. In the particular case described, three impacts of 750 g are adequate to produce gaps of the desired thickness. In this case the piezoresistive elements are cemented in place after the gaps have been formed and tests later made to determine whether the required capability range has been achieved.

It is important to note that when a C-clamp 180 is employed as described above, the needles project into the pads a distance of approximately 5 mils after the gaps are formed. In this case, the distance between the needles on opposite sides of the seismic mass in the completed structure is not merely less than the distance between the ridges but, in fact, is less than the distance between the surrounding surface of the seismic mass. Thus whether the gaps be formed by the first process described above or by the second process, the spacing between the tips of the needles is less than the spacing between the crests and is no greater than the spacing between the adjacent surface of the seismic mass. By surface of the seismic mass here is meant the surface prior to formation of the gaps. Thus, the needles both extend into said wells when the accelerometer is in a neutral position. And at least one needle or the other extends into its corresponding well under any operating condition.

After the accelerometer has been produced it may be employed to produce electrical signals that accurately correspond in amplitude and wave-shape with the acceleration of an object undergoing tests within the capability range of the accelerometer. But beyond that range the output is clipped. Thus, for example, when the accelerometer is subjected to a sinusoidal acceleration having an amplitude within its range of operation, such as 15 g's the output of the accelerometer 10 and the amplifier 40 is likewise sinusoidal as illustrated in FIG. 1a. But when a sinusoidal acceleration of say 100 g's is applied, the peaks of the signals produced by the accelerometer 10 and likewise the peaks of the signal produced by the amplifier 40 are clipped as illustrated in FIG. 1b.

In the best embodiment of the invention, the needle is actually in the form of a polished synthetic sapphire phonograph needle. Such needles have the advantage that they are already accurately machined and readily available at low cost on the open market. However, other types of hard materials may be employed, such as diamonds of industrial quality or better, or tungsten carbide. Hard materials having a Mho scale hardness rating of 8 to 10 are very suitable. The work hardenable material may be of any convenient type, such as Series 300 stainless steel, or beryllium copper. Such material is relatively soft, initially having a Rockwell hardness rating of approximately B90. A hardness of B100 to B120 is readily attained as a result of the repeated impacting. The cement used may be commercial grade nonconductive epoxy cement, such as Epoxylite 6203 that is manufactured and sold by Epoxylite Corporation of South El Monte, Calif.

Stops of the type described above may also be formed by reversing the location of the pad and the stylus, that is, by locating the anvils in the mounting tube and locating the styluses in the mass member. The impacting process brings about a shaping of the soft material to fit the harder material establishing a mating relationship between the two which permits ready control of the thickness of the gap and hence limits the motion of the mass member during acceleration.

In another form of the invention, schematically illustrated in FIG. 11, the mass structure 120a is mounted within a support tube 130a with the mass element 122a supported by means of a flexural hinge 123a from a base member 124a which is cemented directly to the support tube 130a. In this case the seismic mass element 122a projects from the end of the support tube 130a and the stops are formed by means of a pair of needles 160a that are embedded in and project radially outwardly from the end of the mass element 122a toward blocks 170a that are cemented to the ends of the support member 130a.

In practice, the four electrosensitive elements are connected in the arms of a bridge circuit operated with direct current in such a manner as to produce variations of electric potential which is then measured. Alternating current may also be employed. In a practical application, the four electrosensitive elements are connected in a bridge circuit to which a direct current is applied across one diagonal, thereby causing an electrical potential corresponding to the displacement to be developed across another diagonal of the bridge circuit. The output potential is then applied to an amplifier, and the amplified voltage is applied to a utilization device, such as an oscilloscope, an electric meter, or a recording voltmeter, as desired. By virtue of the fact that the motion of the mass is limited, the voltage developed at the output of the ridge is limited in a corresponding manner. In effect, the voltage is clipped. By virtue of this fact, amplifier can be more readily designed taking into account the limits of voltage that are produced at the output of the bridge circuit. By virtue of such limitation of the output of the bridge circuit, the danger of overloading an amplifier and thereby rendering it inoperative during a measurement, may be greatly reduced if not completely eliminated, at least over a wide range of accelerations.

In the foregoing description of the invention, attention has been given to the best method now known for forming the microscopic gaps which serve to permit the accelerometer to work effectively over a limited range without exceeding the breaking point of its electrosensitive elements. In this process the anvil is automatically shaped to mate with the stylus after the stylus and anvil have been mounted in place. It will be understood, however, that it is possible to attain the desired gap in other ways.

In any event it will be understood that the gaps provided on opposite sides of the mass member are sufficient to enable the mass to move through its full range of operation without bringing either pad in contact with its corresponding opposing stylus and that when the acceleration exceeds some safe limit, the two stop elements are brought into contact, thus stopping further movement of the inertial member and thereby preventing excessive strain from developing in the delicate electrosensitive elements.

The invention may also be practiced be employing stops that are of different shapes than those described and are composed of other materials. Thus, the pad may be composed of hard material and the needle of soft work-hardenable material. In this case the points of the needles become blunted during the impacting. Additionally, two work-hardenable materials may be employed. In the best embodiment of the invention though, at least one of the stops is composed of work-hardenable material. In the accelerometer described the movable member is composed of material that is not work-hardenable and a work-hardenable stop element is fixed on the member in question. All material suitable for use as stops now known have a density less than that of the heavy metals that are most suitable for use as the seismic mass.

Though the invention has been described as being applied to an accelerometer, it may also be applied to other types of transducers for detecting and measuring physical phenomena. Thus, the invention may be applied to any kind of device in which the action of a physical phenomenon produces a displacement which strains an electrosensitive element and the stops may be employed to limit the strain of such electrosensitive elements in order to prevent the strain from exceeding a safe level above which the electrosensitive element might otherwise by broken or otherwise rendered unsuitable for use.

The invention claimed is:

1. In an electromechanical transducer wherein an electrosensitive element is fixed to respective interconnected mechanical parts that move relative to each other along a predetermined path thereby subjecting said electrosensitive element to strain in accordance with the influence of a physical phenomenon acting on said mechanical parts, said electrosensitive element having an electrical property that varies in accordance with said strain, said electrosensitive element being liable to damage when strained beyond a safe limit, the improvement that comprises, first and second opposing stop elements fixed to the respective mechanical parts in such positions that at least one of them protrudes toward the other and they engage each other when said mechanical parts are so moved toward each other whereby movement of said parts beyond a predetermined amount is resisted, said stop elements being spaced apart by a microscopic distance in the absence of the mechanical parts being subjected to such influence.

2. An electromechanical transducer as defined in claim 1 wherein at least one of said stop elements is composed of work-hardenable material.

3. An electromechanical transducer as defined in claim 1 wherein said mechanical parts are composed of material that is not work-hardenable and wherein at least one of said stop elements is composed of work-hardenable material.

4. An electromechanical transducer as defined in claim 1 wherein said first and second stop elements are composed of two different materials that are hard and soft respectively compared with each other.

5. An electromechanical transducer as defined in claim 4 wherein said soft material is work-hardenable.

6. In an electromechanical transducer as defined in claim 5 wherein said second stop element has a larger cross section than said first stop element and wherein said second stop element is provided with a well for receiving the end of said first stop element.

7. An electromechanical transducer as defined in claim 6 wherein said first stop element is in the form of a needle and wherein said well is a craterlike shape.

8. In an electromechanical transducer comprising, a cantilever mass structure comprising an elongated member having a pair of coplanar slots extending inwardly from opposite sides thereof and dividing said structure into a base member and a seismic mass member that are connected by a hinge formed between said two slots, said seismic mass member resiliently supported by said hinge for movement about a rotational axis and between parts of a support member, a pair of first stop elements in the form of needles rigidly mounted on one of said members, a pair of second stop elements in the form of pads mounted on the other of said members opposite said respective needles, said needles and said pads being composed of materials that are hard and soft respectively compared with each other, said seismic member being movable in opposite directions for bringing each of the respective pads into contact with the opposite needle, each of said pads having a well positioned to mate with the point of the respective needle, means including piezoresistive elements connected respectively to said seismic member and to said support member across the ends of the respective slots for detecting motion of said mass member relative to said base member and being characterized by a strain limit about which said piezoresistive elements become permanently damaged, the gaps between opposing elements limiting the strain on said piezoresistive elements to a value below such limit, said seismic mass member being composed of a heavy metal, said stop members being composed of a material having a density less than that of said heavy metal.

9. An electromechanical transducer as defined in claim 8, wherein said needles are composed of synthetic sapphire and said pads are composed of work-hardenable material.

10. An electromechanical transducer as defined in claim 8 wherein the said needles simultaneously extend into said corresponding wells.

11. An electromechanical transducer as defined in claim 8 wherein at least one of said needles or the other extends into its corresponding well at any time during operation.

* * * * *